United States Patent [19]

Isa et al.

[11] 3,907,924

[45] Sept. 23, 1975

[54] METHOD OF PRODUCING SYNTHETIC LUBRICATING OIL

[75] Inventors: Hiroshi Isa, Funabashi; Hajime Tomooka, Ichikawa; Yoshihiko Murakami, Yachiyo; Kenji Karube, Tokyo; Takeshi Inomiya, Tokyo; Masuzo Nagayama, Tokyo, all of Japan

[73] Assignee: Lion Fat & Oil Co., Ltd., Tokyo, Japan

[22] Filed: Feb. 26, 1974

[21] Appl. No.: 446,018

[30] Foreign Application Priority Data

Mar. 5, 1973  Japan.............................. 48-026351

[52] U.S. Cl......... 260/683.15 D; 252/59; 260/683.9
[51] Int. Cl.² ........................................... C07C 3/10
[58] Field of Search................ 260/683.15 D, 683.9; 252/59

[56] References Cited

UNITED STATES PATENTS

| | | | |
|---|---|---|---|
| 3,113,167 | 12/1963 | Sauer........................ | 260/683.15 D |
| 3,156,736 | 11/1964 | Southern et al. .......... | 260/683.15 D |
| 3,179,711 | 4/1965 | Antonsen................... | 260/683.15 D |

*Primary Examiner*—Paul M. Coughlan, Jr.
*Attorney, Agent, or Firm*—Woodhams, Blanchard & Flynn

[57] ABSTRACT

A method of producing a synthetic lubricating oil which comprises polymerizing a mixture of $C_8$–$C_{10}$ α-olefins which contains less than 30 mol % of $C_9$ α-olefin and having of average carbon number of 8.7 to 9.7 with the use of Ziegler catalyst or a ternary catalyst made from an alkali metal hydride compound, aluminum halide and titanium halide, and separating an olefin polymer ranging within the boiling point of the lubricating oil from the resulting polymerization reactant.

6 Claims, No Drawings

METHOD OF PRODUCING SYNTHETIC LUBRICATING OIL

BACKGROUND OF THE INVENTION

1. Field of the Invention

The present invention relates to a method of producing a synthetic lubricating oil, and in detail to a method of producing a synthetic lubricating oil having a high viscosity index, high flash point and low pour point, and whose viscosity is extremely low at lower temperatures, by mixing $\alpha$-olefins of different chain length in a proper ratio and polymerizing them.

2. Description of the Prior Art

There are many kinds of lubricating oils such as petroleum lubricating oils, synthetic lubricating oils, fatty oils, etc. The need for lubricating oils having a high flash point, a high viscosity index and low pour point, etc. has increased. However, the petroleum lubricating oils which are now employed do not have all of the foregoing desired properties perfectly.

On the other hand, recently, in synthetic lubricating oils produced by organic synthesizing methods, attention has been paid to liquid polymers (olefin polymer oils) obtained by polymerizing olefins. However, the polymerization of olefins does not produce polymer oils having the desired high viscosity index when there are used general polymerization methods such as cationic polymerization, radical polymerization, etc. which are accompanied by isomerization. Therefore, recently in the production of olefin polymer oils, the so-called coordinated anionic Ziegler catalyst that effects regular polymerization has become important, and many kinds of lower polymerization reactions using olefins as raw materials have been tried. For instance, when $C_8$ olefins are polymerized with the use of a complex compound prepared from monoethyl aluminum dichloride and titanium tetrachloride as a catalyst, a lubricating oil can be obtained which has a viscosity of 40 centistokes at a temperature below 100°F, a viscosity index of 130, a flash point of 420°F and a pour point of −70°F.

However, because lubricating oils are used as working oils for aircraft and as lubricating oils for jet engines, etc., there is now a need for a lubricating oil having further improved performance whose viscosity is low even at extremely low temperatures. Consequently, the foregoing polymer oil is fractionally distilled and one part thereof is employed, but the oil obtained through fractional distillation does not always attain a satisfactory condition. For instance, the lubricating oil prepared by polymerizing $C_8$ $\alpha$-olefin and distilling fractionally has a tendency that the viscosity become too high at extremely low temperatures as the viscosity index is not so high, and both the flash point and fire point become lower. Also, the lubricating oil prepared by polymerizing $C_{10}$ $\alpha$-olefin and distilling fractionally has a tendency that the viscosity is suitable at low temperatures, but the pour point becomes too high. Moreover, when those polymer oils are mixed in a proper ratio, the merits of the respective polymer oils are merely mutually lost, and a lubricating oil possessing all of the desired properties has not been obtained yet.

It is reasoned that if those polymer oils are fractionally distilled accurately by repeating the methods such as molecular distillation method, etc., there is the possibility that one part thereof will be used as the working oils for aircraft, but the yield is about 10. Therefore, the method cannot be employed as the industrial process at all.

SUMMARY OF THE INVENTION

An object of the present invention is to provide a method of producing a synthetic lubricating oil having a high viscosity index, high flash point and low pour point and showing low viscosity at extremely low temperatures. Another object of the present invention is to provide a method of producing a novel synthetic lubricating oil for which conventional production facilities can be used.

As a result of many kinds of experiments and examinations for producing a lubricating oil provided with high performance by the polymerization of olefins, the present inventors have discovered that $\alpha$-olefins of $C_8$–$C_{10}$ are suitable as raw material olefins and an extremely satisfactory synthetic lubricating oil is obtained with the use of a mixture of $\alpha$-olefins which contains less than 30 mol % of $C_9$ $\alpha$-olefin which has an average carbon number of 8.7 to 9.7. The present invention has been completed on the basis of the foregoing discovery.

Namely, in a method of producing a synthetic lubricating oil in which a raw material olefin is polymerized with the use of a complex compound prepared from a titanium halide and an alkyl aluminum compound selected from the group consisting of $AlR_3$, $AlR_2Cl$, $AlR_{1.5}Cl_{1.5}$ and $AlRCl_2$ (R is an alkyl group), or a mixture consisting of an alkali metal hydride, aluminum halide and titanium halide as a catalyst, an olefin polymer having a boiling point within the range of that of lubricating oils is separated from the resulting polymerization reaction mixture, and a synthetic lubricating oil is produced. The method of producing a synthetic lubricating oil according to the present invention is characterized by employing as said starting olefins, a mixture of $\alpha$-olefins of $C_8$–$C_{10}$ which contain less than 30 mol % of $C_9$ $\alpha$-olefin olefins and which have an average carbon number of 8.7 to 9.7.

As described above, the starting material olefins used in the present invention are octene-1, nonene-1 and decene-1, and those olefins are properly mixed for use so that the ratio of mixing becomes less than 30 mol % of $C_9$ $\alpha$-olefin (nonene-1) and the average carbon number becomes 8.7 to 9.7, preferably 8.8 to 9.2. In case mixture of starting olefins is outside this range, the desired lubricating oil cannot be obtained. Also, it is not preferable to mix olefins below $C_8$–$C_{10}$ in the starting olefin mixture, but if they are mixed, the allowable amount thereof must be at most within about 10 percent.

In polymerizing the mixture of those starting material olefins namely, $\alpha$-olefins, either a complex compound (Ziegler catalyst) prepared from a titanium halide and alkyl aluminum compound or a ternary catalyst (metal hydride catalyst) consisting of an alkali metal hydride, aluminum halide and titanium halide is used.

When using a Ziegler catalyst, there can be used alkyl aluminum compounds, trialkyl aluminum ($AlR_3$), dialkyl aluminum chloride ($AlR_2Cl$), alkyl aluminum sesquichloride ($AlR_{1.5}Cl_{1.5}$) and alkyl aluminum dichloride ($AlRCl_2$). As the titanium halides, there can be used titanium tetrachloride, titanium tetrabromide, titanium trichloride halides, etc. Two or more kinds of alkyl aluminum compounds may be mixed and used. The alkyl groups of the compounds are not important and they are generally a methyl group, ethyl group and n-propyl group, but the ratio of the alkyl aluminum compound to the titanium halide is preferred to be in the range of 0.5–5.0 Al:Ti mol ratio. On the other hand, in case of using the hydride catalysts, as alkali metal hydride compounds, there can be used lithium hydride, sodium hydride, potassium hydride, sodium borohydride, lithium aluminum hydride, etc., and as aluminum halides, there can be used aluminum trichloride, aluminum tribromide, alkyl aluminum dichloride, etc., and as titanium halides, the foregoing compounds have been known. The ratio of the alkali metal hydride compound to aluminum halide is preferably from 1 : 0.5 to 1 : 6 (mol ratio), and the ratio of titanium halide to aluminum halide is preferably from 1 : 0.5 to 1 : 2 (mol ratio).

The polymerization reaction is carried out with the use of a mixture of α-olefins whose average carbon number is 8.7 to 9.7 and in the presence of said catalyst at temperatures of 0° to 200°C. In case of using the hydride catalysts, alkali metal hydride compounds and aluminum halides are previously dissolved or dispersed in solvents such as diethyl ether, tetrahydrofuran, 1,4-dioxane, saturated hydrocarbon, etc. for activation.

The polymerization reaction in the present invention can be carried out with or without the use of the solvents. As the solvents to be used in the reaction, paraffinic hydrocarbons containing n-paraffin and isoparaffin, naphthenic hydrocarbons, hydrocarbon halides or mixtures thereof are preferable, and as proper concrete examples, n-pentane, isooctane, cyclohexane, dimethylcyclohexane, trichloroethane, methylchloroform, tetrafluoroethane, etc. are enumerated. In case of using those solvents for the reaction, the weight ratio of the solvent to olefin is proper to be in the range of 1 : 2 to 4 : 1. While, in case of not using those solvents, the starting material olefin mixture itself is made to function as a reaction solvent, but it is necessary to take notice in the control of the reaction heat as the reaction proceeds rapidly. As the control methods for the reaction heat, a method of gradually adding the raw material olefins or catalyst, a method of forcibly cooling by outside heat-exchange, and the like are effective. In order to decompose the catalyst after the reaction is over, an alcohol or alkaline aqueous solution is generally used, but the use of an amine or ammonia is most preferable so that no halogen remains in the polymer. Unreacted olefins and olefin dimers are contained in the resulting polymer solution and are not preferred in the performance of the lubricating oil, and therefore, they are removed through distillation and extraction. Also, in order to improve the thermal stability of the lubricating oil, the remaining double bonds may be hydrogenated. The hydrogenation can be easily effected with the use of hydrogenation catalysts such as Raney nickel, etc.

As described above, the present invention is to provide a method of producing a higher synthetic lubricating oil having a high viscosity index, a high flash point, and a low pour point and a considerably low viscosity at extremely low temperatures, by polymerizing a mixture of $C_8$–$C_{10}$ α-olefins which contains less than 30 mol % of $C_9$ α-olefin and having an average carbon number of 8.7 to 9.7 with the use of Ziegler catalyst or the hydride catalyst. According to the present invention, the lubricating oil satisfying all of the standard values in U.S. ARMY STANDARDS MIL-H83282 (working oils for aircraft) can be obtained with a yield above 50 percent.

The property of the oligomer of each olefin is shown in TABLE 1 which is prepared by polymerizing with the use of Ziegler catalyst, distilling it to remove the unreacted olefins and olefin dimers from the resulting polymer solution, thereafter taking out 50 percent of fractional distillate corresponding to the lubricating oil, and hydrogenating it.

As shown in TABLE 1, in the oligomer using $C_6$, $C_8$ olefins as starting materials, if the viscosity at −40°F is regulated within the standard, the flash point and fire point become problems because of its low viscosity index, and therefore, particularly the fire point will not be able to satisfy the standard even if any means is employed. On the other hand, in the oligomer using $C_{10}$ olefin as a raw material, the fire point and the viscosity at low temperatures are preferable, but the pour point is high, and further there is a drawback that a cloud point appeared at about −20F. Even if those olefins are simply mixed and polymerized, or various kinds of polymers are properly blended, the result does not satisfy the standard, and the lubricating oil that passes the standard of MIL-H83282 cannot be obtained as long as $C_8$–$C_{10}$ α-olefins are not mixed and polymerized so that less than 30 mol % of $C_9$ α-olefin is contained in the ratio of mixing and the average carbon number is 8.7 to 9.7 as described in the present invention.

TABLE 1

| MIL-H83282 in standard | Hexene Oligomer | Octene Oligomer | Decene* Oligomer | $C_{6-10}$ Oligomer (carbon number 8.7) | $C_{8-10}$** Oligomer (carbon number 9.0) |
|---|---|---|---|---|---|
| Viscosity 210°F (CS) above 3.5 | 3.95 | 4.04 | 4.09 | 4.00 | 4.02 |
| Viscosity 100°F (") above 16.5 | 18.50 | 19.30 | 19.20 | 19.30 | 18.60 |
| Viscosity −40°F (") below 2600 | 3500 | 2800 | 2200 | 3000 | 2400 |
| Flash point (°F) above 400 | 380 | 415 | 440 | 430 | 442 |
| Fire point (°F) above 475 | 420 | 440 | 490 | 460 | 480 |
| Pour point (°F) below −65 | −80 | −80 | −50 | −70 | −80 |
| Viscosity Index | | | | | |

TABLE 1-continued

| MIL-H83282 in standard | Hexene Oligomer | Octene Oligomer | Decene* Oligomer | $C_{6-10}$ Oligomer (carbon number 8.7) | $C_{8-10}$** Oligomer (carbon number 9.0) |
|---|---|---|---|---|---|
| above 120 | 90 | 118 | 132 | 111 | 130 |

*Fractional distillate of decene oligomer corresponding to the lubricating oil is 35%.
**An example of the present invention.

DESCRIPTION OF THE PREFERRED EMBODIMENTS

EXAMPLE 1-4

2,000 cc of an α-olefin mixture was charged into a four neck flask provided with a stirrer, cooler, nitrogen inlet tube and thermometer, and 4.3 of monoethyl aluminum dichloride and 21.0 g of titanium tetrachloride were added as catalysts, and polymerization was carried out. Keeping the temperature during the polymerization between 20° to 40°C, it was stirred for four hours.

After completing the reaction, ammonia gas was blown thereinto and the resulting precipitate was separated by filtration to remove the catalysts. The resulting crude reaction solution was distilled to remove unreacted olefins and the dimers and thereafter a fractional distillate corresponding to the working oil for aircraft was obtained. The cut of the fractional distillate was set so that the viscosity at 100°F and the viscosity at −40°F satisfy the standard MIL-H83282. Thereafter, it was hydrogenated with the use of Raney nickel as a catalyst at a temperature of 150°C and under the condition of hydrogen pressure 20 Kg/cm² to obtain working oil base having a performance shown in TABLE 2.

TABLE 2

| Raw Material Olefin | (Example -1) Octene-1 Decene-1 | (Example -2) octene-1 Decene-1 | (Example -3) Octene-1 Nonene-1 Decene-1 | (Example -4) Octene-1 Decene-1 |
|---|---|---|---|---|
| Olefin mixed ratio (mol%) | $C_8$ 60 $C_{10}$ 40 | $C_8$ 50 $C_{10}$ 50 | $C_8$ 40 $C_9$ 20 $C_{10}$ 40 | $C_8$ 30 $C_{10}$ 70 |
| Average carbon number | 8.8 | 9.0 | 9.0 | 9.4 |
| Olefin conversion (%) | 80 | 81 | 79 | 77 |
| Oligomer yield (%) | 70 | 72 | 69 | 68 |
| Distillate corresponding to working oil (for oligomer %) | 40 | 45 | 52 | 42 |
| Viscosity 210°F (CS) | 4.00 | 4.05 | 4.01 | 4.08 |
| Viscosity 100°F (CS) | 18.60 | 19.10 | 18.50 | 19.00 |
| Viscosity −40°F (CS) | 2550 | 2500 | 2550 | 2400 |
| Flash point (°F) | 420 | 440 | 440 | 440 |
| Fire point (°F) | 476 | 480 | 480 | 485 |
| Pour point (°F) | −80 | −80 | −80 | −75 |
| Viscosity index | 121 | 126 | 132 | 132 |

EXAMPLE 5

200 cc of diethyl ether was charged into the four neck distillation flask, and 17 g of aluminum chloride was added and dissolved. Thereafter, 3.1 g of lithium halide was added and a catalyst was prepared, and most of ethyl ether was distilled off, and 800 cc of a mixed α-olefins in which ocetene-1 : decene-1 was 1 : 2 and 25 g of titanium tetrachloride were added.

The reaction was carried out for four hours at 100°C–120°C. After completing the reaction, according to the method in Example 1, distillation and hydrogenation were carried out to obtain a working oil base having a performance shown in Table 3.

TABLE 3

| Olefin conversion (%) | | 88 |
|---|---|---|
| Oligomer yield (%) | | 80 |
| Distillate corresponding to working oil (for oligomer %) | | 85 |
| Viscosity | 210°F (CS) | 4.02 |
| | 100°F (CS) | 18.60 |
| | −40°F (CS) | 2400 |
| Viscosity index | | 130 |
| Flash point | (°F) | 442 |
| Fire point | (°F) | 480 |
| Pour point | (°F) | −80 |

What is claimed is:

1. In a method of producing a synthetic lubricating oil which comprises polymerizing a feed olefin by contacting said feed olefin with a catalyst system selected from the group consisting of (1) a catalyst complex prepared from a titanium halide and at least one kind of alkyl aluminum compound selected from the group consisting of $AlR_3$, $AlR_2$, $AlR_{1.5}Cl_{1.5}$ and $AlRCl_2$, wherein R is alkyl, and (2) a ternary catalyst consisting essentially of an alkali metal hydride compound, an aluminum halide and a titanium halide, the improvement which comprises:

said feed olefin contains from about 90 to 100 mole percent of a mixture of α-olefins selected from the group consisting of octene-1, nonene-1 and decene-1, said mixture containing less than 30 mole percent of nonene-1 and having an average carbon atom number in the range of 8.7 to 9.7, and the balance of the feed olefin is α-olefins of lower carbon atom number, and recovering from the polymerization reaction mixture a synthetic lubricating oil having a viscosity at 210°F of above 3.5 centistokes, a viscosity at 100°F of above 16.5 centistokes, a viscosity at −40°F of below 2,600 centistokes, a flash point above 400°F, a fire point above 475°F, a pour point of below −65°F and a viscosity index above 120.

2. A method according to claim 1 wherein said feed olefin consists of 100 mole percent of said mixture.

3. A method according to claim 1 wherein, in said recovering step, the polymerization reaction is first treated to remove unreacted feed olefin and olefin dimers, then the remainder of the polymerization reaction mixture is fractionally distilled to recover a synthetic lubricating oil fraction and hydrogenating said fraction to obtain said synthetic lubricating oil.

4. A method according to claim 1, in which said mixture has an average carbon atom number in the range of 8.8 to 9.2.

5. A method according to claim 1 wherein the catalyst is said catalyst complex (1) having a molar ratio of Al:Ti in the range of 0.5 to 5.0:1.

6. A method according to claim 1 in which the catalyst in said ternary catalyst (2) in which the molar ratio of alkali metal hydride compound:aluminum halide is from 1:0.5 to 1:6, and the molar ratio of titanium halide:aluminum halide is from 1:0.5 to 1:2.

* * * * *

UNITED STATES PATENT OFFICE
CERTIFICATE OF CORRECTION

PATENT NO. : 3,907,924
DATED : September 23, 1975
INVENTOR(S) : Hiroshi Isa et al It is certified that error appears in the above-identified patent and that said Letters Patent are hereby corrected as shown below:

Column 7, line 4; after "reaction" insert ---mixture---.

Column 8, line 8; change "in" (first occurrence) to ---is---.

Signed and Sealed this twenty-seventh Day of January 1976

[SEAL]

Attest:

RUTH C. MASON
*Attesting Officer*

C. MARSHALL DANN
*Commissioner of Patents and Trademarks*